UNITED STATES PATENT OFFICE.

HOWARD PORTER DECHERT, OF NEW YORK, N. Y.

IMPROVEMENT IN GALVANIC BATTERIES.

Specification forming part of Letters Patent No. 184,005, dated November 7, 1876; application filed February 26, 1876.

*To all whom it may concern:*

Be it known that I, HOWARD P. DECHERT, of the city, county, and State of New York, have invented a new and useful Improvement in the Solution Employed in Galvanic Batteries; and I do hereby declare that the following is a full, clear, and exact description thereof The nature of my invention consists in the use of a solution of chloride of calcium in the galvanic battery, in connection with some exciting material as the medium for containing the poles of the battery.

Chloride of calcium of any density of solution (preferably at its greatest non-crystallizing density, which is above 30° Baumé) is placed in the battery vessel or cell, and the respective plates or poles placed therein. A metallic oxide, as of copper or manganese, is placed adjacent to the copper, carbon, or other positive pole. In this case greater activity of action is imparted to the battery by means of the partial hydration of the metallic oxide and its action upon the negative pole. Substituting magnesium for zinc renders this form of battery conveniently small for temporary purposes.

By using a carbon pole and adding sal-ammonia salt (chloride of ammonia) to the chloride-of-calcium solution, a battery of increased temporary power is obtained by the decomposition of the sal-ammonia salt and zinc. This form of the battery is adapted to stand unemployed for a long time, always ready for service when the circuit shall be closed.

The value of the use of chloride of calcium consists in its superior conducting qualities when used in the battery, as described. Its other advantages are its deliquescence and slight evaporation. Used in connection with an exciting substance, as described, it forms a valuable arrangement for the galvanic battery.

I usually employ a perforated rubber or other non-conducting material between the poles in order to secure them against contact.

Having described my invention, what I claim, and desire to secure by Letters Patent, is—

The application of chloride of calcium to galvanic batteries, in connection with an exciting substance, substantially as described.

In testimony that I claim the foregoing as my own I hereunto subscribe my hand in presence of two witnesses.

HOWARD PORTER DECHERT.

Witnesses:
L. P. ROSSITER, Jr.,
HENRY E. MALIN.